June 20, 1967     H. L. PASTAN     3,326,047
PRESSURE TRANSDUCER

Filed Jan. 15, 1965     3 Sheets-Sheet 1

INVENTOR
HARVEY L. PASTAN
BY,
Wolf, Greenfield & Hieken
ATTORNEYS

June 20, 1967  H. L. PASTAN  3,326,047
PRESSURE TRANSDUCER
Filed Jan. 15, 1965  3 Sheets-Sheet 2

INVENTOR
HARVEY L. PASTAN
BY,
Wolf, Greenfield & Hieken
ATTORNEYS

INVENTOR
HARVEY L. PASTAN
BY,
Wolf, Greenfield & Sacks
ATTORNEYS

3,326,047
PRESSURE TRANSDUCER
Harvey L. Pastan, Brookline, Mass., assignor to American Brake Shoe Company, Cambridge, Mass., a corporation of Delaware
Filed Jan. 15, 1965, Ser. No. 425,751
8 Claims. (Cl. 73—398)

This invention relates to fluid pressure sensing transducers and more particularly comprises a new and improved strain gage transducer for directly measuring fluid pressure.

Recently considerable development has occurred in the field of direct sensing pressure strain gage transducers of the type which include one or more annular chambers defined by inner and outer deformable generally cylindrical walls and which is filled with a liquid sealed by a diaphragm that in turn is adapted to be exposed directly to the medium whose pressure is to be measured. The pressure exerted against the diaphragm is transmitted by the liquid against the cylindrical walls, and strain gage windings secured to the walls, sense their deformation and as part of a signal generator render a signal which is a measure of the deformation and consequently the pressure exerted on those walls. An example of such a transducer is found in my co-pending application Ser. No. 394,910 filed Sept. 8, 1964, now Patent No. 3,273,400.

Maximum accuracy of pressure measurements are achieved with such instruments if the deformation of the cylindrical walls is strictly limited to the effects of changes in pressure of the liquid. If the deformation results from other than changes in liquid pressure, then a measurement of the deformation obviously does not reflect merely the pressure of the liquid but those extraneous forces on the walls as well. One source of stress upon the cylindrical walls which causes deformation results from the mounting torque. When the base of the instrument is clamped in place on a support, bending stresses are introduced into the base which may be transferred to the cylindrical walls, and such a stress creates an extraneous transducer output by deforming the walls. This problem is particularly acute when the base is formed as an integral part of one of the cylindrical walls.

A related source of difficulty is the change in the pressure of the liquid caused by bending of the base. While the bending of the base may not directly cause a distortion in either of the cylindrical walls, its bending may cause a change in the volume of the chamber containing the liquid which will either reduce or increase the pressure of the liquid against the deformable cylindrical walls.

One important object of this invention is to reduce extraneous forces that are exerted on the cylindrical walls of direct sensing pressure transducers.

A more specific object of this invention is to reduce, if not eliminate, shifts in transducer output which result from mounting torque and base plate bending of the transducer.

To accomplish these and other objects, this invention includes a pressure capsule having inner and outer deformable cylindrical walls which define a cavity in turn filled with fluid. The cavity is generally annular in shape, and a small stem extends axially from the capsule, which stem is substantially smaller in diameter than the annular cavity. The small stem is secured in an opening in the base plate, and a passage extends through the stem and communicates with the annular cavity. A chamber is formed on the plate on the side away from the capsule, and the chamber is sealed at the bottom by a diaphragm. The liquid which fills the annular cavity also fills the passage and the chamber, and, therefore, any changes in the pressure exerted against the outer face of the diaphragm is transmitted directly to a change in pressure exerted by the liquid on the deformable cylindrical walls.

These and other objects and features of this invention along with its incident advantages will be better understood and appreciated from the following detailed description of several embodiments thereof, selected for purposes of illustration and shown in the accompanying drawing, in which.

Figure 1:
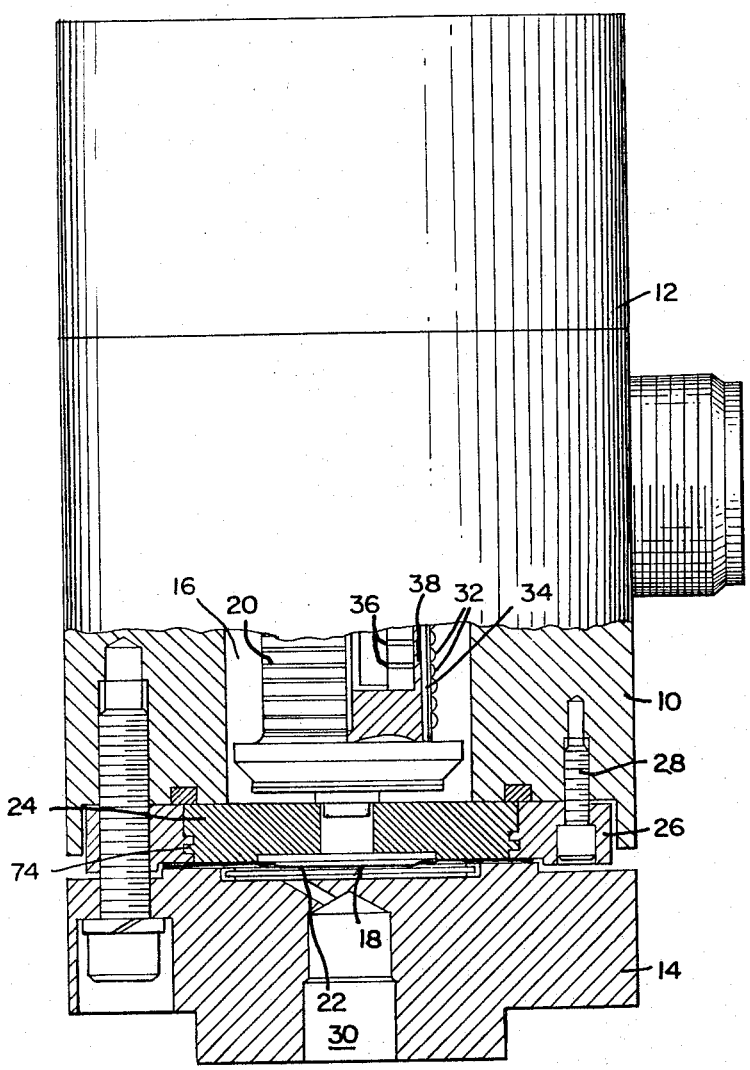
FIG. 1 is a cross-sectional view of a pressure transducer constructed in accordance with this invention.

In FIG. 1 the transducer assembly is shown to include a body 10, a bottom cover 12 and a cap 14 that cooperate to define a capsule chamber 16 and a pressure pick up chamber 18. Within the chamber 16 is a pressure capsule 20 which directly measures pressure exerted upon diaphragm 22 that extends across the pick up chamber 18. The capsule 20 is supported on an inner capsule base 24. The capsule 20 and the base 24 are shown in detail in FIG. 2 and will be described in detail presently. The inner capsule base 24 is threaded into an outer body base 26 which is retained on the body by screws 28 (one of which is shown). Diaphragm 22 which extends across the pick up chamber 18 is clamped against the outer body base 26 by the cap 14. A passage 30 formed in the cap 14 and adapted to be connected by some form of coupling (not shown) to the liquid whose pressure is to be measured, communicates with the portion of the pick up chamber 18 outside the diaphragm 22.

Figure 5:
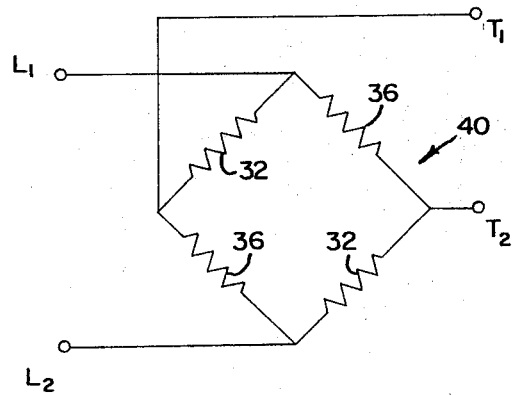
FIG. 5 is a schematic diagram showing the sensing circuit of this invention.

A pair of wire strain gages 32 is wound about and bonded to the outer surface of the outer cylindrical wall 34 of the capsule 20, and a second pair of wire strain gages 36 is bonded to the inner surface of the inner cylindrical wall 38 of the capsule. As suggested in FIG. 5, each of the wire strain gages forms one leg of a bridge circuit 40 which may be energized from some remote location through lines $L_1$ and $L_2$. A meter (not shown) may be connected to the bridge at some remote location across the terminals $T_1$ and $T_2$ to measure the voltage across the bridge.

Figure 2:
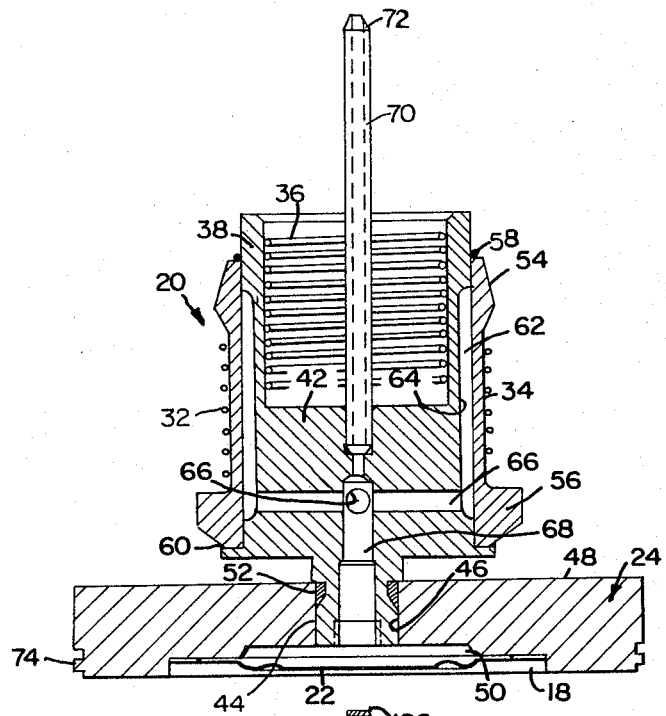
FIG. 2 is an enlarged cross-sectional view of a portion of the transducer shown in FIG. 1.

In FIG. 2 the capsule 20 and capsule base 24 are shown in detail. The inner cylindrical wall 38 which supports the strain gages 36 is closed at one end by its base plate 42 formed as an integral part of the inner cylindrical wall 38. The base plate 42 is provided with a small diameter stem 44 that extends coaxially with the cylindrical wall 38, which stem fits within an opening 46 in the capsule base 24 extending outwardly from the surface 48 of the base plate. The opening 46 into the base plate 24 communicates with recess 50 which forms part of the pick up chamber 18 defined between the base plate 24 and the cap 14 of the device. As shown in FIG. 2, the stem 44 is secured in the opening 46 by a brazed joint 52. Other means may be employed to secure the stem in place, but it is preferred that the stem be free of external threads which register with mating threads on the inner surface of the opening. Such threaded connections introduce considerable stress in the body when the threaded parts are tightened on one another.

The outer cylindrical wall 34 is formed with enlarged end portions 54 and 56 which are respectively brazed to the outer surface of the inner cylindrical wall 38 as suggested at 58 and 60. An annular cavity or chamber 62 is defined between the inner and outer cylindrical walls 38 and 34 because of the annular recess 64 provided on the outer surface of the inner cylindrical wall 38 as is clearly evident in FIG. 2. The annular chamber or cavity 62 communicates by means of several radially extending passages 66 with axially extending passage 68 provided in the base plate 42 and extending through stem 44. Thus, the chamber 62, passages 66 and passage 68 communicate with the portion of the pick up chamber 18 within or behind the diaphragm 22. The chamber 62, the passages 66 and 68 and the portion of the sensing chamber 18 within diaphragm 22 are filled with a liquid such as oil. Filling is achieved through pipe 70 which communicates with the passage 68 in the base plate 42 of the inner cylinder 38. After the chambers and passages are filled through the tube 70, the tube is plugged as suggested at 72.

Because the base plate 24 is supported at its periphery by threads 74 which screw into the inner surface of the annular body base 26, the torque and other forces applied to the base 24 through its mounting are remote from the stem 44. Consequently, the forces or torque applied to the periphery of the base 24 will not be transferred as stresses to either of the cylindrical walls 34 and 38. The inner wall 38 is particularly susceptible to such forces because it is integral with the stem 44, but because the stem 44 is of such small diameter and is located at the most remote location in the base 24 from the base periphery, the stresses will not be transferred to the wall 38.

The outer and inner cylindrical walls 34 and 38 are preferably subjected only to hoop stress in response to changes in the pressure of the liquid which fills the annular chamber 62. The portions of the walls 34 and 38 which support the strain gages 32 and 36 are readily deformable but possess enough rigidity to withstand the pressures of the fluid over the normal operating range of the instrument.

Figure 3:
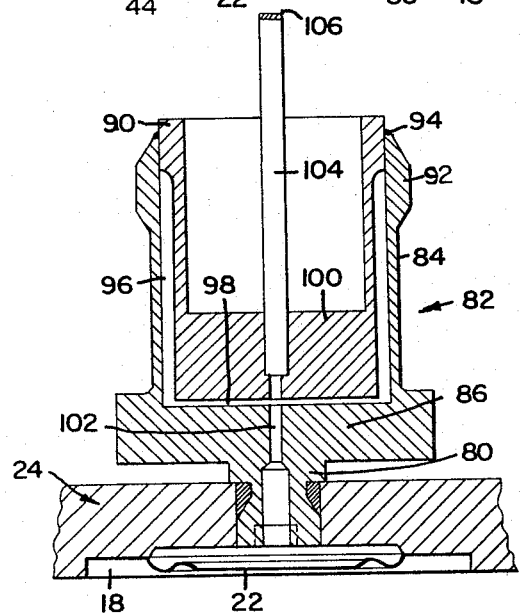
FIG. 3 is an enlarged cross-sectional view similar to FIG. 2 and showing another embodiment of this invention.

The embodiment of this invention shown in FIG. 3 is very similar to that of FIG. 2. However, the construction of the capsule is somewhat different. While in the embodiment of FIG. 2 the inner cylindrical wall is formed integrally with the stem 44, in the embodiment of FIG. 3 the stem 80 of the capsule 82 is integral with the outer cylindrical wall 84. The outer cylindrical wall is closed by a base plate 86 at its lower end as viewed in FIG. 3, and the inner cylindrical wall 88 is secured at its upper end 90 to the upper end 92 of the outer cylindrical wall by brazing as suggested at 94. The walls are not connected at their lower ends. The annular chamber 96 defined between the inner and outer cylindrical walls communicates with a flat passage 98 between the bottom plate 86 of the outer cylindrical wall and the bottom plate 100 of the inner cylindrical wall. The flat passage 98 in turn communicates with axial passage 102 which extends through the stem 80 and the base plate 86. As in the previous embodiment, the passage 102 in the stem 80 communicates with the portion of the pick up chamber in the base plate 24 above the diaphragm 22. Just as in the previous embodiment, the small size diameter of the stem 80 as compared to the size of the annular passage 96 and the diameter of the plate 24 substantially eliminates any transfer of mounting torque or other forces from the periphery of the base 24 to either of the cylindrical walls 84 and 88. Therefore, no strain gage output will be produced by any such forces applied to the plate and transferred to the liquid in the chamber 96 and passages 98 and 102. It is evident in FIG. 3 that the chamber 96 along with the passages 98 and 102 as well as the portion of the pick up chamber 18 above the diaphragm 22 are filled through the tube 104 in turn closed by plug 106.

Figure 4:
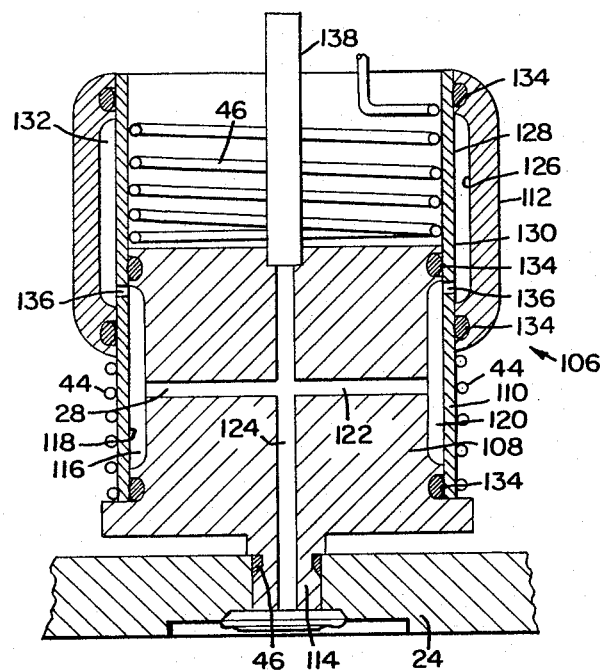
FIG. 4 is an enlarged cross-sectional view similar to FIGS. 2 and 3 but showing still another embodiment of this invention.

The embodiment of FIG. 4 differs from that of FIGS. 2 and 3 only in the construction of the capsule. The capsule is substantially identical to the capsule in my co-pending application, supre. However, the capsule is secured to the base plate 24 in the same manner as employed in the other embodiments. In the embodiment of FIG. 4 the capsule 106 includes an inner body 108, a surrounding cylinder 110 and a sleeve 112. The inner body 108 is provided with a stem 114 which fits in the opening 46 in the capsule base in precisely the same manner as in the other embodiments.

An annular recess 116 is formed in the outer surface of the inner body 108 and defines with the lower portion 118 of the surrounding cylindrical wall 110 a first annular chamber 120. The chamber 120 is in communication with radial passages 122 in the inner body 108, which in turn connects with the axially extending passage 124 that terminates at the bottom of stem 114.

The sleeve 112 which surrounds the upper portion of the cylindrical wall 110 is provided with an annular recess 126 in its inner surface, which cooperates with the outer surface 128 of the upper portion 130 of the cylindrical wall 110 to define a second annular chamber 132. The ends of the sleeve 112 and the ends of the inner body 108 are brazed to the cylindrical wall 110 as suggested at 134. Chamber 132 communicates with chamber 120 through a plurality of small holes 136 in the wall 110. Therefore, the liquid which fills the chambers 120 and 132 along with the passages 122 and 124 and the upper portion of the chamber 118 above the diaphragm 22 (introduced throuhg the tube 138) are all under the same pressure. As in the other embodiments, strain gages are wound about the deformable portions of the cylindrical walls that define the chambers to measure the deformation resulting from the pressure applied to those walls.

It is evident from the foregoing that in each of the three embodiments of this invention shown the cylindrical walls which define the inner and outer surfaces of the chambers of the capsule are not subjected to bending stresses when the base plate of the capsule is secured in place on the body 10. Consequently, there is no shift in the transducer output due to mounting torque or other similar extraneous forces.

It is also evident from the foregoing that any bending of the plate will cause a negligible change in the pressure of the liquid in the annular chambers, passages, and pick up chambers so as not to produce any transducer output.

From the foregoing description those skilled in the art will appreciate that numerous modifications may be made of this invention without departing from its spirit. Therefore, it is not intended to limit the breadth of this invention to the specific embodiments illustrated and described. Rather, it is intended that the scope of this invention be determined by the appended claims and their equivalents.

What is claimed is:
1. A pressure measuring device comprising:
a base plate having an opening therethrough,
means defining a pick up chamber on one side of said plate in communication with the opening,
a capsule mounted on said plate having a small diameter steam sealed by brazing in the opening and extending from the side of the plate opposite the chamber,
an annular chamber provided within the capsule and defined by relatively thin and flexible inner and outer cylindrical walls coaxial with the opening and each having a diameter substantially greater than the diameter of the stem, said stem being small enough to prevent the transfer of stresses to the cylindrical walls from mounting torque exerted on the plate,
a passage through the stem connecting the annular chamber and the opening in the plate,
a diaphragm closing the side of the pick up chamber in the plate and adapted to be subjected to the pressure to be measured,
a pressure transmitting liquid filling the pick up chamber, opening, passage and annular chamber and adapted to be subjected to the pressure applied to the diaphragm; and means secured to the inner and outer cylindrical walls and sensitive to the changes in shape of the cylindrical walls resulting from changes in pressure of the transmitting liquid.

2. A pressure measuring device comprising:

a capsule having inner and outer radially deformable cylindrical walls defining an annular chamber between them, a small diameter stem extending axially of the capsule and forming a part thereof, said stem diameter being substantially smaller than the diameter of the deformable walls, a passage through the narrow stem and in communication with the chamber, a capsule base having an opening therein in which the stem is joined by brazing, said stem being small enough to prevent the transfer of stresses from the stem to the cylindrical walls from mounting torque exerted on the plate, a diaphragm secured to the base over its face away from the capsule and closing the passage and annular chamber in the capsule, a fluid filling the passage and annular chamber behind the diaphragm and applying pressure to the cylindrical walls equal to the pressure applied to the diaphragm, and means for sensing the distortion of the cylindrical walls in response to changes in the pressure exerted against the diaphragm.

3. In a pressure measuring device, a pressure capsule having an annular chamber with inner and outer cylindrical walls deformable in response to changes in pressure within the chamber, a circular mounting plate for the capsule having a small opening extending axially therethrough from one side of the plate, a small stem extending axially from the capsule and sealed within the opening and small enough to prevent the transfer of stresses to the cylinder from mounting torque exerted on the plate, a brazed joint connecting the stem in the opening, a passage in the stem, means sealing the cavity defined by the annular chamber and the passage, and a liquid sealed in the cavity and filling it.

4. A pressure measuring device as defined in claim 3 further characterized by a shallow chamber on the side of the plate away from the capsule and communicating with the opening, and a diaphragm sealing the side of the chamber away from the opening and filled with the liquid in the cavity.

5. A pressure measuring device as defined in claim 4 further characterized by said stem being integral with the inner cylindrical wall of the capsule.

6. A pressure measuring device as defined in claim 4 further characterized by said stem being integral with the outer cylindrical wall of the capsule.

7. A pressure measuring device as defined in claim 4 further characterized by said stem being integral with one of the two cylindrical walls.

8. A pressure measuring device as defined in claim 4 further characterized by said stem having a smooth outer cylindrical surface fitted into the plate.

References Cited

UNITED STATES PATENTS 3,237,138   2/1966   Kooiman et al. _____ 338—4

FOREIGN PATENTS 1,065,113   12/1953   France.

LOUIS R. PRINCE, *Primary Examiner.*

D. O. WOODIEL, *Assistant Examiner.*